United States Patent [19]

Dewey, Jr. et al.

[11] 4,350,047
[45] Sep. 21, 1982

[54] VORTEX-SHEDDING FLOWMETER HAVING TWO BLUFF BODIES

[75] Inventors: Clarence F. Dewey, Jr., Marblehead, Mass.; David E. Wiklund, Marshalltown, Iowa

[73] Assignee: Fisher Controls Company, Inc., Marshalltown, Iowa

[21] Appl. No.: 188,188

[22] Filed: Sep. 18, 1980

[51] Int. Cl.³ ............................................. G01F 1/32
[52] U.S. Cl. ................................................. 73/861.22
[58] Field of Search ............ 73/861.22, 861.23, 861.24

[56] References Cited

U.S. PATENT DOCUMENTS 3,572,117 3/1971 Rodely .
3,996,796 12/1976 Adler ................................ 73/861.22

FOREIGN PATENT DOCUMENTS 55-469 1/1980 Japan ................................. 73/861.22
1500704 2/1978 United Kingdom ............. 73/861.22

Primary Examiner—Herbert Goldstein
Attorney, Agent, or Firm—Arthur E. Hoffman

[57] ABSTRACT

A vortex-shedding flowmeter comprising two stationary vortex-shedding cross-members (i.e., bluff bodies) disposed transversely to a stream of fluid. Each cross-member has a bluff face with sharp Karman vortex generating edges with independently selected edge to edge widths d of from 10 to 40% of the inside width of the conduit through which the fluid flows and lengths l of from 0.3 to 2.0d. The second cross-member is disposed downstream of the first cross-member a distance of from 4 to 15 times the width d of the first cross-member. Any sensor may be used in any location provided it or they sense the Karman vortices generated by co-action of the two cross-members. This flowmeter provides strong signals with a high signal to noise ratio and high Strouhal number.

7 Claims, 6 Drawing Figures

U.S. Patent  Sep. 21, 1982  Sheet 1 of 2  4,350,047
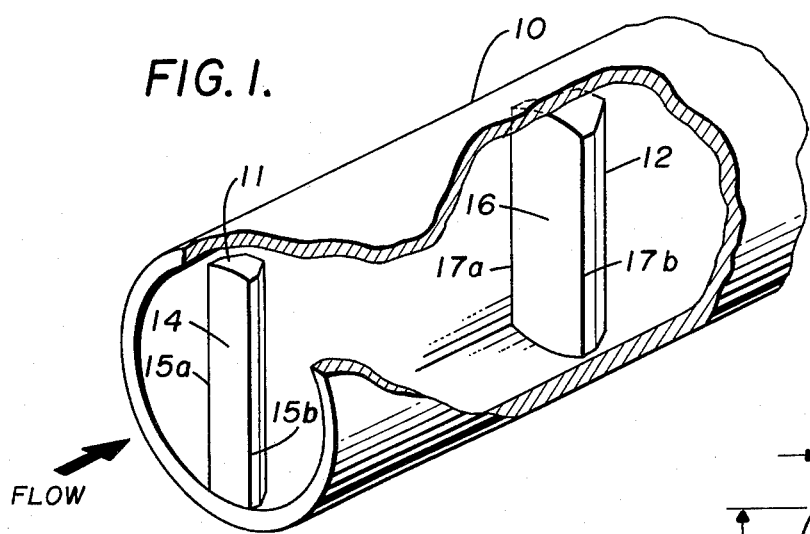
FIG. 1.
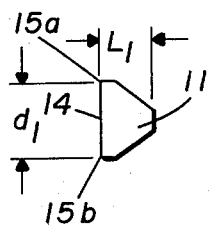
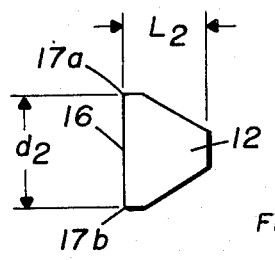
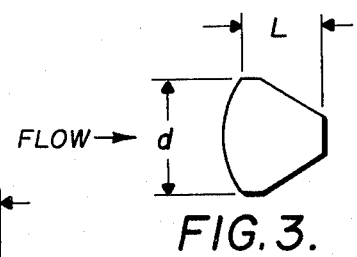
FIG. 3.
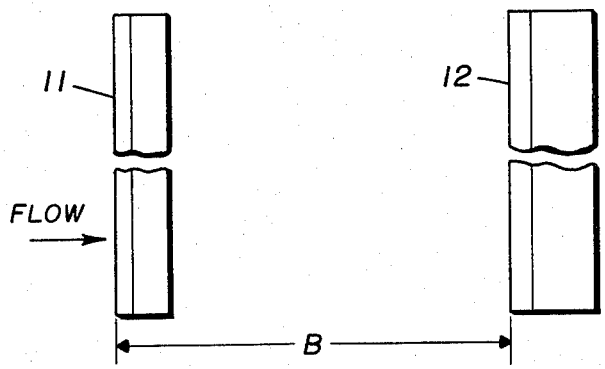
FIG. 2.
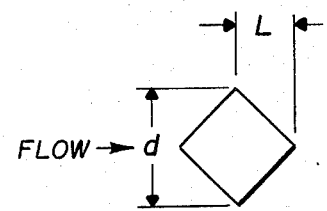
FIG. 4.
FIG. 5.

VORTEX-SHEDDING FLOWMETER HAVING TWO BLUFF BODIES

BACKGROUND OF THE INVENTION

This invention relates to flowmeters of the vortex-shedding type. More particularly it relates to vortex-shedding flowmeters wherein Karman vortex streets are generated which provide strong signals, a high signal to noise ratio and a predictable, improved Strouhal number.

The operation of a vortex-shedding flowmeter is based upon placing a bluff-body obstacle in the flow path of a fluid, providing regular vortex patterns which are known as a Karman vortex street. The repetition rate at which vortices are shed in a Karman vortex street is a direct function of flow velocity.

The accuracy, however, of a vortex-shedding flowmeter depends on several factors. Karman vortex streets oscillate in a generally sinosoidal wave form and various sensors are known for detecting the frequency or amplitude of this wave, converting the sensed variable into an electrical signal and then through appropriate electrical circuitry converting such electrical signal into a measurement of flow rate or flow velocity.

A major consideration in the design of a vortex-shedding flowmeter is the signal strength and the related signal-to-noise ratio. Noise is generated by turbulent fluid fluctuations unassociated with the Karman vortex street. The strength of the Karman vortex street signal divided by this noise level is the signal-to-noise ratio. Signal strength is directly proportional to the amplitude of the Karman vortex street. The greater the amplitude the less significant will be any random variations in amplitude. By increasing signal strength without a proportional increase in noise, the signal-to-noise ratio is increased providing greater sensitivity to the flowmeter.

Intermittency of the signal occurs however when the Karman vortex street randomly varies in either or both its amplitude or frequency. Much work has been done by others to avoid this intermittency problem which affects accuracy. Rodely in U.S. Pat. No. 3,572,117 found that intermittency could be reduced by using a bluff-body having sharp vortex-generating edges wherein the bluff face of the body has a width d of from 15 to 40% of the inside diameter of the flowpipe and the body has a length l downstream of such sharp edges of from 1.0d to 2.0d.

Another phenomena which affects accuracy is "drop-out" which is a sudden, very brief, random loss of measured signal caused by a momentary weakening of signal or momentary increase in background noise.

Another consideration, however, in the design of a vortex-shedding flowmeter is the Strouhal number which relates to fluid flow according to the equation $$St. = (fd)/(V) \qquad (1)$$

where St. is the Strouhal number, f is the frequency of the Karman vortex street, d is the characteristic width of the bluff body surface transverse to the direction of fluid flow, and V is the mean flow velocity of the fluid. At low Reynolds numbers the Strouhal number varies with flow velocity, but at higher Reynolds numbers in the range of about $10^4$ to $10^6$ the Strouhal number is independent of flow velocity. It has been found that, all other variables being constant, the higher the Strouhal number the more accurate the flowmeter because the adverse affects of drop-out diminish. It can be seen from equation (1) that the Strouhal number is directly proportional to the frequency f of the Karman vortex street. Thus, at any constant flow velocity V, the Strouhal number can only be increased by increasing the frequency f of the Karman vortex street or by increasing the width d of the bluff body.

Since the bluff body is an obstacle there is a certain pressure drop in the fluid flowing past it. To increase its width d beyond that optimumly dimensioned for its bluff body performance is counter-productive since it would present more of an obstruction and greater pressure drop.

Thus, increasing the frequency f of the Karman vortex street is the most desirable way of improving accuracy by increasing the Strouhal number.

It has also been found that for any given width d of a bluff body the frequency of the Karman vortex street tends to increase as the length l of the bluff body downstream of the bluff face decreases. Rodely, however, precludes length l from being less than 1.0d without intermittency becoming a problem.

The objective of this invention is to provide an accurate vortex-shedding flowmeter capable of providing a Karman vortex street having an improved combination of signal strength, high signal-to-noise ratio, high frequency and a predictable, improved Strouhal number.

BRIEF SUMMARY OF THE INVENTION

The present invention provides a vortex-shedding flowmeter comprising a conduit through which a fluid whose flow rate or velocity is to be measured can be flowed, and disposed within the conduit, in the direction of fluid flow, are, interalia (a) a first stationary vortex-shedding cross-member (i.e., a bluff-body) which extends across the interior of said conduit transversely to the direction of fluid flow, said first cross-member having (i) an upstream bluff surface disposed transversely to the direction of fluid flow having sharp Karman vortex-generating edges with an edge to edge width $d_1$ of from about 10% to 40% of the inside width of said conduit and (ii) a length $l_1$ extending downstream from said sharp edges of said bluff surface of from about $0.3d_1$ to $2.0d_1$ (b) a second stationary vortex-shedding cross-member (i.e., a second bluff body) disposed downstream from said first cross-member a distance B of from about $4d_1$ to $15d_1$, said second cross-member being disposed across the interior of said conduit transversely to the direction of fluid flow, said second cross-member having (i) an upstream bluff surface disposed transversely to the direction of fluid flow having sharp Karman vortex-generating edges with an edge width $d_2$ of from about 10% to 40% of the inside width of said conduit and (ii) a length $l_2$ extending downstream from said sharp edges of said bluff surface of from about $0.3d_2$ to $2.0d_2$, and (c) means for sensing the combined affect of said first and second cross-members on the Karman vortex street.

This invention is not limited to the use of any particular type of sensor means. The art is replete with sensors operating on various principles. For example, thermal transducers such as thermistors, hot wire and hot film elements; and pressure transducers such as piezoelectric, strain gage, capacitance and shuttle elements; and so on.

Nor is this invention limited in the cross-sectional shape of the conduit since the flowmeter can be calibrated or corrected for shape in converting sensor output to flow rate. Since, however, the most conventional conduits used for flowmeters are cylindrical pipes, the following discussion will be largely in terms of flow-pipes where pipe diameter is the width of the pipe.

With the added, co-acting effect of the second cross-member, the signal is strengthened sufficiently that the sensor can advantageously be located on or in the second cross-member without experiencing the poor signal-to-noise ratio problem cited by Rodely in U.S. Pat. No. 3,572,117 which led him to place his sensor outside of the wake of the Karman vortex street. However, although location of the sensor on or in the second cross-member is a preferred embodiment of this invention, the sensor may if desired be located anywhere inside or outside of the wake in accordance with principles known in the art so long as the general criteria is met that it senses the Karman vortex street generated by co-action of the two cross-members.

The design of each cross-member is critical in that each bluff upstream surface must have sharp edges in order to generate a strong Karman vortex street with regularity and linearity over a wide range of flow rates. In each the width of the bluff surface is advantageously from about 10% to 40% of the inside width of the conduit (both widths being measured in the same plane). At widths d above 40% of the pipe diameter, the bluff surface presents a major obstruction to flow with concommitant higher pressure drop without any added benefit in performance. At widths d below 10% of the pipe diameter, performance suffers because the signal strength decreases to a point where the signal-to-noise ratio becomes too low, resulting in adnormalities.

The shape of each bluff surface may be flat or convex so long as the sharp edges are present. The bluff surface shapes taught by Rodely in U.S. Pat. No. 3,572,117 may be used to advantage.

The length l of each cross-member is measured from the sharp edges of the bluff surface to the downstream end of the cross-member. In this regard, since the shape of the trailing end of the cross-member may vary as taught in Rodely and other prior art, the length l is the effective length of the cross-member measured parallel to the flow direction of the fluid from the sharp edge to the downstream end of the cross-member. While this invention is operable at cross-member lengths of 2d, as discussed above the frequency f of the Karman vortex street tends to increase as the length l of the cross-member decreases. In order to maximize the Strouhal number and make it more predictable, and to provide greater accuracy, it is a preferred embodiment of this invention to use cross-members having a length l of from about 0.3d to 1d. Below about 0.3d the performance falls off drastically. A length l of from about 0.4d to about 0.75d provides optimum performance.

Preferably, for a short distance downstream of the sharp edges of the bluff surface of each cross-member, width d remains constant, for example as shown in FIG. 2. Otherwise, for example if the downstream portion of the cross-member tapers sharply away from the sharp edge, the continually flowing fluid will eventually erode the sharp edges, reducing the effective width d of the cross-member and changing the operating characteristics of the flowmeter. By having width d remain constant for a brief distance downstream of the sharp edges the service life of the cross-member is substantially increased.

It is not necessary to this invention that the first and second cross-members be sized or shaped the same. They may be individually designed for optimum results in operation. In designing the second cross-member, in the preferred embodiment where the sensor is located on or in this cross-member, consideration must be given to the size necessary to accomodate the sensor and the shape necessary to proper function of the sensor. Sensor size requirements will often make it difficult to design such second cross-member to the optimum length $l_2$ discussed above, particularly for use in smaller sized conduits, e.g. in pipes of 1 inch to 1.5 inch (2.5 to 3.8 cm.) diameter. For example, in pipes of this small size range it has been found that a length $l_2$ of from about $0.9d_2$ to $1.2d_2$ provides a good trade-off between size requirements and the desire for high frequency. In pipes of about 2 inch (5.1 cm)diameter, size requirements permit designing length $l_2$ to the higher end of the above discussed optimum range. In this context therefore the second cross-member preferably has a length $l_2$ of from about $0.5d_2$ to $1.2d_2$, and more optimumly from $0.5d_2$ to $0.9d_2$.

It should be pointed out here that none of the disabling intermittency problems cited by Rodely in U.S. Pat. No. 3,572,117 are encountered in the practice of this invention, even at lengths l of 0.3d to 1.0d. Though some intermittency at the lower end of the length l range of this invention can be detected with today's ultra-sensitive test equipment, it is of a degree which does not interfere with the performance of flowmeters of this invention.

The second cross-member is placed downstream of the first cross-member a distance B, measured from the sharp edges of the first cross-member to the sharp edges of the second cross-member, of at least $4d_1$. Below $4d_1$ performance falls off. The upper limit of $15d_1$, however, is not as critical. Economy considerations require keeping the flowmeter as short as possible, though theoretically the Karman vortex streets generated by the first cross-member will carry downstream greater distances. Since the vortex street increases in lateral dimension as it moves downstream, at some downstream distance B wall effects from the pipe will significantly distort the vortex street. Therefore the actual maximum for distance B must be empirically established for each flowmeter design and size, but $15d_1$ appears to be a generally safe upper limit. Preferably however distances B of from about $4.5d_1$ to $7d_1$ are used, with optimum results as about $4.5d_1$ to $5.5d_1$.

A complete flowmeter according to this invention will of course have further components necessary to receive the signal from the sensor, convert it electronically to a useful form for measurement, indication and/or control of the fluid flow rate or velocity. Such components and electronic circuitry are well known in the art and this invention is not limited in this regard. The electronic circuitry generally, but not necessarily, is packaged in a portion of the flowmeter housing, normally with an analog or digital display of the measured flow rate or velocity right on the meter. Optionally, however, whether display on the flowmeter itself is used or not, the display can advantageously be located some distance from the flowmeter, for example in a control room. In such instances, the flowmeter is provided with appropriate outputs connected by wire or by wireless transmission to the remote display. In addition to or in place of visual display these outputs from the flowmeter can be connected as the measured process variable input to an electronic controller for making suitable changes in the process on the basis of the information received from the flowmeter.

OUTLINE OF THE DRAWINGS

FIG. 1 is a schematic perspective view, with a portion of a flow-pipe cut away, of the first and second cross-member of a flowmeter which comprises one embodiment of this invention.

FIG. 2 is a side-view and a top-view of the two cross-members of FIG. 1, but with dimensions $d_1$, $d_2$, $l_2$ and B shown as an aid to understand the teaching set forth herein.

FIGS. 3, 4 and 5 are illustrative of some of the many shapes, from a top view, which can be used in the practice of this invention for either or both of the cross-members.

FIG. 6 is a cut-away perspective view of one embodiment of a flowmeter incorporating the features of this invention.

DESCRIPTION OF THE DRAWINGS

The drawings herewith and the following description are merely illustrative of some embodiments of this invention. It will be appreciated that many changes and variations may be made within the inventive concept of this invention.

Turning to FIGS. 1 and 6, there is shown a flow-pipe 10 having disposed therein a first cross-member 11 and a second cross-member 12 in the direction of fluid flow. Located in the second cross-member 12 is a sensor 13 (not shown in FIG. 1 but shown in FIG. 6) for sensing the Karman vortex street generated by the first and second cross-members and providing an electrical signal proportional to the flow rate and velocity of the fluid.

Figure 6:
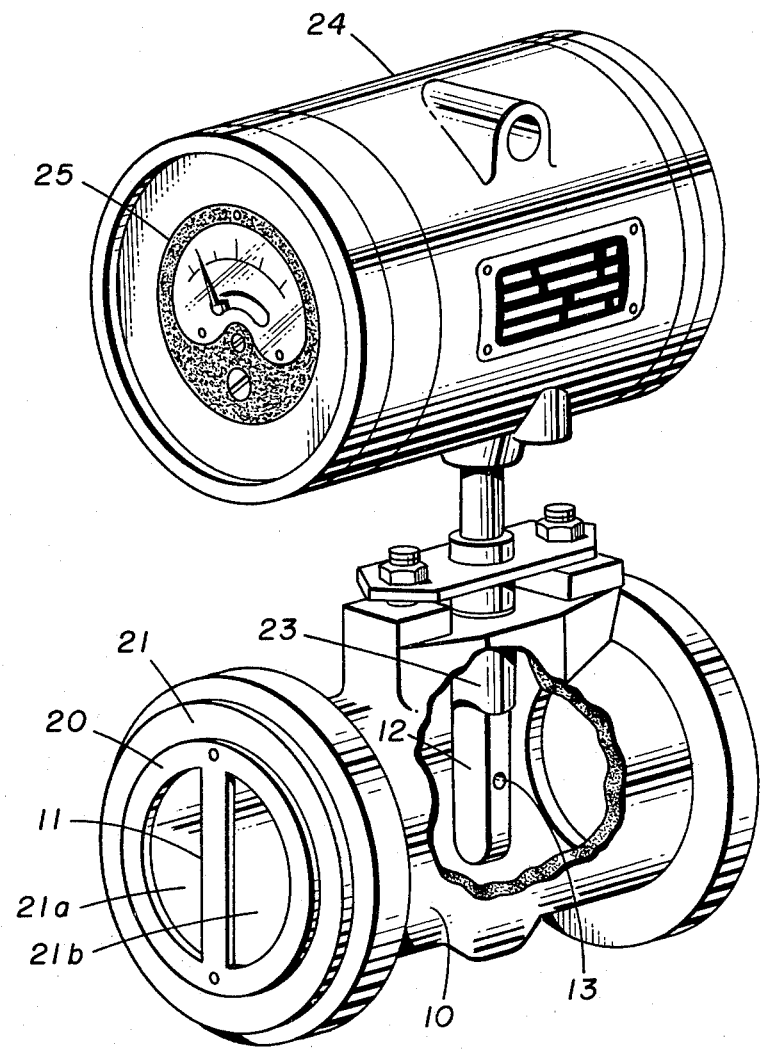

The first cross-member 11 is shown in FIGS. 1 and 6 with a flat upstream surface 14 disposed transversely to the direction of fluid flow, the flat surface ending with sharp edges 15a and 15b, providing flat surface 14 with an effective width $d_1$ as shown in FIG. 2. If desired, surface 14 can be convex or of other shape as long as its edges are sharp, for example as shown in FIGS. 3–5. Cross-member 11 has an effective downstream body length $l_1$ as shown in FIG. 2.

The second cross-member 12 is shown in FIGS. 1 and 6 with a flat upstream surface 16 disposed transversely to the direction of fluid flow, the flat surface ending with sharp edges 17a and 17b, providing an effective width $d_2$ as shown in FIG. 2. Here again surface 14 can, if desired, be convex or another shape as long as its edges are sharp, for example as shown in FIGS. 3–5. Cross-member 11 has an effective downstream body length $l_2$ as shown in FIG. 2. The second cross-member 12 is placed downstream of the first cross-member 11 a distance B as measured from the sharp edges 15a and 15b of the first cross-member to the sharp edges 17a and 17b of the second cross-member. As shown in FIG. 1 distance D is about $4d_1$ and as shown in FIG. 2 distance D is about $5.3d_1$. As shown in FIG. 6, distance D is about $10d_1$ which is more than the preferred separation between the two cross-members 11 and 12, but is used for the illustrative purposes of FIG. 6 to avoid crowding of the components in the drawing and allow better showing of details.

Returning to FIG. 6, the flowmeter embodiment shown places the first cross-member 11 in a circular plate 20 designed to fit into a groove (not shown) in flowmeter inlet flange 21, fluid flow passages 22a and 22b are cut from plate 20 to leave cross-member 11 as an integral section thereof and the circular periphery of the flow passages 22a and 22b conforming as closely as possible to the inside diameter of flow-pipe 10 so as to minimize or avoid the formation of eddy currents during fluid flow which would add to noise picked up by the sensor.

The second cross-member 12 in FIG. 6 is held in position by a sleeve 23 which is contoured to slidably but closely fit the cross-sectional profile of cross-member 12. Sleeve 23 does not extend into the fluid flow path and is shaped at its end proximate the inside wall of the flow-pipe 10 so as to minimize or avoid formation of eddy currents. Cross-member 12 extends from inside flow-pipe 10 through sleeve 23 and into meter housing 24 which contains suitable electronic circuitry (not shown) and a meter 25 for display of the flow rate or velocity of the fluid. At its other end cross-member 12 fits into a recess (not shown) in the bottom of flow-pipe 10.

Both cross-member 11 and 12 are stationarily mounted within the flow-pipe. By stationary is meant that they are not free to pivot as do vanes or to move laterally as do the "wagging-tail" Type of bodies. Those skilled in the art will recognize however that cross-members 11 and 12 are subject to torsional stresses when fluid is flowing which can cause torsional twisting or flexing of the cross-members, particularly at high flow rates.

As will be apparent various modifications can be made to the flowmeter embodiment shown in FIG. 6 without changing the operating components thereof. Various means may be used to mount the stationary cross-members within flow-pipe 10. Nor is it necessary that cross-member 12 extend out of the flow-pipe and into housing 24, nor need it be within a sleeve. Advantageously, cross-member 12 when equipped with the sensor 13 may terminate at whatever means is employed to mount it in flow-pipe 10 with leads extending outside the flow-pipe to wherever the electronic circuitry is chosen to be located.

What is claimed is:

1. A vortex-shedding flowmeter comprising a conduit through which a fluid flows and disposed therein in the direction of fluid flow
   (a) a first stationary vortex shedding cross-member extending across the interior of said conduit transversely to the direction of fluid flow, said first cross-member having (i) an upstream bluff surface disposed transversely to the direction of fluid flow having sharp Karman vortex-generating edges with an edge to edge width $d_1$ of from about 10 to 40% of the inside width of said conduit and (ii) a length $l_1$, extending downstream from said sharp edges of said bluff surface, of from about $0.3d_1$ to $2.0d_1$.
   (b) a second stationary vortex-shedding cross-member disposed downstream from said first cross-member a distance B of from about $4d_1$ to $15d_1$, said second cross-member being disposed across the interior of said conduit transversely to the direction of fluid flow, said second cross-member having (i) an upstream bluff surface disposed transversely to the direction of fluid flow having sharp Karman vortex-generating edges with an edge to edge width $d_2$ of from about 10 to 40% of the inside width of said conduit and (ii) a length $l_2$ extending downstream from said sharp edges of said bluff surface of from about $0.3d_2$ to $2.0d_2$, and (c) means for sensing the Karman vortices shed from said first and second cross-members:

2. A vortex-shedding flowmeter as in claim 1 wherein said first cross-member has a length $l_1$ of from about $0.3d_1$ to $1.0d_1$.

3. A vortex-shedding flowmeter as in claim 2 wherein length $l_1$ is from about $0.4d_1$ to $0.75d_1$.

4. A vortex-shedding flowmeter as in claim 1 wherein the second cross-member is disposed downstream of the first cross-member a distance B of from about $4.5d_1$ to $7d_1$.

5. A vortex-shedding flowmeter as in claim 4 wherein distance B is from about $4.5d_1$ to $5.5d_1$.

6. A vortex-shedding flowmeter as in claim 1 wherein said second cross-member has a length $l_2$ of from about $0.5d_2$ to $1.2d_2$.

7. A vortex-shedding flowmeter as in claim 6 wherein length $l_2$ is from about $0.5d_2$ to $0.9d_2$.

* * * * *